United States Patent [19]

Schad et al.

[11] Patent Number: 5,069,615

[45] Date of Patent: Dec. 3, 1991

[54] STACK MOLD WITH INSULATED RUNNER

[75] Inventors: Robert D. Schad, Toronto; Vitaly Akselrud, Richmond Hill; John DiSimone, Woodbridge, all of Canada

[73] Assignee: Husky Injection Molding Systems Ltd., Bolton, Canada

[21] Appl. No.: 577,262

[22] Filed: Sep. 4, 1990

[51] Int. Cl.[5] .............................................. B29C 45/40
[52] U.S. Cl. ................................. 425/556; 264/297.2; 264/297.4; 264/328.8; 425/450.1; 425/451.9; 425/572; 425/595
[58] Field of Search ............... 425/556, 572, 595, 581, 425/588, 574, 575, 450.1, 451.9; 264/297.2, 297.4, 297.7, 328.8, 328.5

[56] References Cited

U.S. PATENT DOCUMENTS

| | | | |
|---|---|---|---|
| 3,023,458 | 3/1962 | Seymour | 425/146 |
| 3,093,865 | 6/1963 | Peters et al. | 425/547 |
| 3,103,039 | 9/1963 | Robinson | 425/549 |
| 3,183,555 | 5/1965 | Siegel | 425/595 |
| 3,537,139 | 11/1970 | Segmuller | 425/549 |
| 3,591,897 | 7/1971 | Perras | 425/144 |
| 3,663,145 | 5/1972 | Teraoka | 425/588 |
| 3,758,248 | 9/1973 | Drazick | 425/145 |
| 3,776,676 | 12/1973 | Kessler | 425/572 |
| 3,843,294 | 10/1974 | Bielfeldt et al. | 425/572 |
| 3,970,821 | 7/1976 | Crandell | 425/144 |
| 4,239,476 | 12/1980 | Somberg | 425/572 |
| 4,249,882 | 2/1981 | Koch et al. | 425/547 |
| 4,427,618 | 1/1984 | Sorensen | 264/328.9 |
| 4,539,171 | 9/1985 | Sorensen | 425/572 |
| 4,752,199 | 6/1988 | Arai | 264/328.8 |
| 4,891,001 | 1/1999 | Gellert | 264/297.2 |

FOREIGN PATENT DOCUMENTS 3504816 8/1986 Fed. Rep. of Germany .

Primary Examiner—Timothy Heitbrink
Attorney, Agent, or Firm—Bachman & LaPointe

[57] ABSTRACT

A stack mold apparatus for forming plastic articles is described. The apparatus includes an insulated runner system for delivering molten plastic material to the mold spaces for forming the parts. The apparatus further includes a mechanism for ejecting the solidified material of the runner when it becomes necessary to change the plastic material being used. In a first embodiment, the ejector mechanism has a pair of movable plates that form part of the central mold portion of the stack mold. In a second embodiment, the ejector mechanism has a movable plate, forming half of the central mold portion, having sucker pins and ejector bars incorporated therein.

15 Claims, 10 Drawing Sheets

STACK MOLD WITH INSULATED RUNNER

BACKGROUND OF THE INVENTION

The present invention relates to an injection molding apparatus for forming plastic articles. More particularly, the present invention relates to a stack mold apparatus having an insulated runner configuration and an automatic system for ejecting the runner for color or resin changes.

Molding apparatuses for delivering molten plastic material to a mold space are known in the art. Those having insulated runners are particularly well known in the art. In fact, they are the forerunner of today's hot runner molding systems. Seymour U.S. Pat. No. 3,023,458 illustrates one such early hot runner mold system. In this system, a gate for providing plastic material to a mold space is opened by a valve stem that is pushed back by virtue of the injection pressure of the plastic material pushing on a shoulder of the stem. When this pressure is removed, the valve stem is moved to a closed position by a spring. Channels for carrying heating devices are provided in close proximity to the runner cavity so as to keep plastic material in an inlet chamber heated.

Peters et al U.S. Pat. No. 3,093,865 illustrates an early insulated runner system in which there is an insulating thermoplastic layer adjacent the walls of the runners and an inner molten thermoplastic material. This system also includes two plates which can be separated to allow ejection of the runner during resin changes. Latching means in the form of a bolt are used to hold these plates together and facilitate separation. Heated probes are used in the system's nozzles so as to allow interruptions in the molding operation for a period of time equal to the maximum time the plastic material will remain molten in the runner.

Perras U.S. Pat. No. 3,591,897 illustrates a runnerless mold system useful for the injection molding of thermoset plastics. The mold features mechanically separable parts or subassemblies for opening and closing the mold. The mold also has thermodynamically isolated regions or zones whereby curing heat is supplied to the mechanically separate parts which define the mold cavity, and cooling or lesser heat is provided for the sprue and runner system to assure non-curing conditions for injected plastic that has yet to reach the cavity regions. The sprue-and-runner system includes a specially cooled secondary sprue associated with each independent mold cavity.

The use of heated probes in combination with hot runners or insulated runners is also well known in the art. Robinson U.S. Pat. No. 3,103,039, Whitney U.S. Pat. No. 3,189,948, Drazick U.S. Pat. No. 3,758,248 and Crandell U.S. Pat. No. 3,970,821 exemplify such combinations. The heated probes are used primarily to maintain the temperature of the material flowing through the sprue and/or runner system during injection into a mold or die.

Segmuller U.S. Pat. No. 3,537,139 relates to an injection nozzle arrangement for a hot channel injection molding device which comprises a heated distributor plate means, a mold portion cooperating with the heated distributor plate means and means providing at least one delivery channel for the injection molding material. Each delivery channel incorporates a recess which is partially formed in the heated distributor plate means and partially in the mold portion. The mold portion is provided with a number of injection openings corresponding to the number of delivery channels. The arrangement further includes the provision of at least one heat conducting core located internally of each delivery channel and extending at least throughout a portion of the length of the delivery channel substantially coaxially with respect to and into the associated injection opening. Each such heat conducting core being in a heat conducting relationship with the heated distributor plate means.

Kessler U.S. Pat. No. 3,776,676 and German Offenlegungsschrift 3,504,816 to Hemmerich illustrate systems having insulated runners. The Kessler patent illustrates an insulated runner used in combination with cold sub-runners. The German Offenlegungsschrift to Hemmerich shows an insulated runner for two resins injected simultaneously through a common nozzle. The runners are formed between a number of different plates.

It is also known in the art to provide hot runner systems with a latching device which provides access for removal of the complete hot runner system. Savory U.S. Pat. No. 3,669,596 illustrates one such system. In the Savory system, a bolt is used to lock two die parts together to permit inspection and cleaning of the injection nozzle.

Sorenson U.S. Pat. No. 4,427,618 shows an insulated runner multicavity injection molding apparatus. The invention described in this patent is directed to injection molding a product in such a manner that the angle of the inclination to the injection point of the surface of the product is between 0° and 90°. In this system, the insulated runner has gating points on the sides of the parts being formed. The insulated runner is formed between the faces of two plates which separate along a plane perpendicular to the clamping direction.

Insulated runners have been used in the past because they provide superior streamlining of the runners so that there is less degradation of material when compared to the plastic material in the channels of a hot runner manifold. Insulated runners allow faster changing of resins because the entire runner system can be removed. It does not have to be purged like a hot runner.

Stack mold systems are also well known in the art. Teraoka U.S. Pat. No. 3,663,145 and Koch et al. U.S. Pat. No. 4,249,882 illustrate stack molds with a cold runner system which can be ejected on each molding cycle. A special machine with an extruder/injection unit mounted on the side of the mold is required to run the mold.

Bielfeldt et al. U.S. Pat. No. 3,843,294 also shows a stack mold system. In this system, there is a centrally heated sprue that remains heated throughout the cycle. The mold is used for forming parts having holes in them, such as records or discs. There is however, no runner system in that the resin is delivered directly from the heated sprue.

Swedish Patent 7810352-0 to Somberg illustrates a stack mold for processing elastomeric resins, i.e. those that remain flexible even after cooling. The mold ejects a cold runner system during every cycle at the same time the parts are ejected. A special mechanism is provided in the mold for automatically ejecting the runner. This mechanism includes a complicated linkage and hinge system for swinging the mold plates aside to allow a sleeve to strip the runner from a vertical pin around which it is formed during injection. As a result of this construction, the mold requires a lengthy opening stroke and a long mold open time to achieve ejection of the runner. Both factors are quite detrimental to cycle time and complication of the mold construction.

Accordingly, it is an object of the present invention to Provide an improved injection molding apparatus having an automatic ejection system for ejecting the runner.

It is a further object of the present invention to provide an apparatus as above which is relatively simple in construction and in use.

It is a further object of the present invention to provide an apparatus as above which makes use of an insulated runner system to prevent degradation of the plastic material.

These and other objects and advantages will become more apparent from the following description and drawings in which like reference numerals depict like elements.

SUMMARY OF THE INVENTION

As previously discussed, the present invention relates to an injection molding apparatus for forming plastic articles and in particular to a stack mold apparatus. An apparatus in accordance with the present invention includes a first mold portion, a second mold portion and an intermediate or central third mold portion. The mold portions are movable relative to each other along a first axis between mold open and mold closed positions. The first mold portion has a first mold plate which mates with a corresponding mold plate on the third mold portion to define at least one mold space. The second mold portion has a second mold plate which mates with yet another mold plate on the third mold portion to form at least one other mold space.

The apparatus further includes means for supplying molten plastic material to the mold spaces. This supply means include an insulated runner system. The apparatus further includes means for ejecting the runner system in a direction substantially parallel to the axis of movement of the mold portions.

In a first embodiment of the present invention, the ejection means comprises two ejector plates mounted to the third mold portion. The ejector plates move between a retracted position and an ejection position through a piston cylinder arrangement formed as part of the third mold portion. In this embodiment, the respective mold plates forming the mold spaces are latched to each other during the ejection operation so as to expose the runner system for ejection.

In a preferred embodiment of the present invention, the third or intermediate mold portion is formed by two central plates which are latched together during the molding operation and which can be moved relative to each other during the runner system ejection operation. In this embodiment, the runner system is formed by passageways cut into each of the plates. At least one of the plates has at least one sucker pin mounted thereto for withdrawing the solidified runners from the passageways in the other plate. The ejecting means itself comprises one or more bars housed within a channel or channels in the one central plate and a means for moving the bar(s) relative to the plate so as to strip the solidified runners from the sucker pin or pins. In this embodiment, the bar moving means is preferably formed by a rod mounted to each bar and the ejector system for removing articles from the molding apparatus.

Further details of the present invention will become more apparent from the following description and drawings.

DETAILED DESCRIPTION

Figure 1:
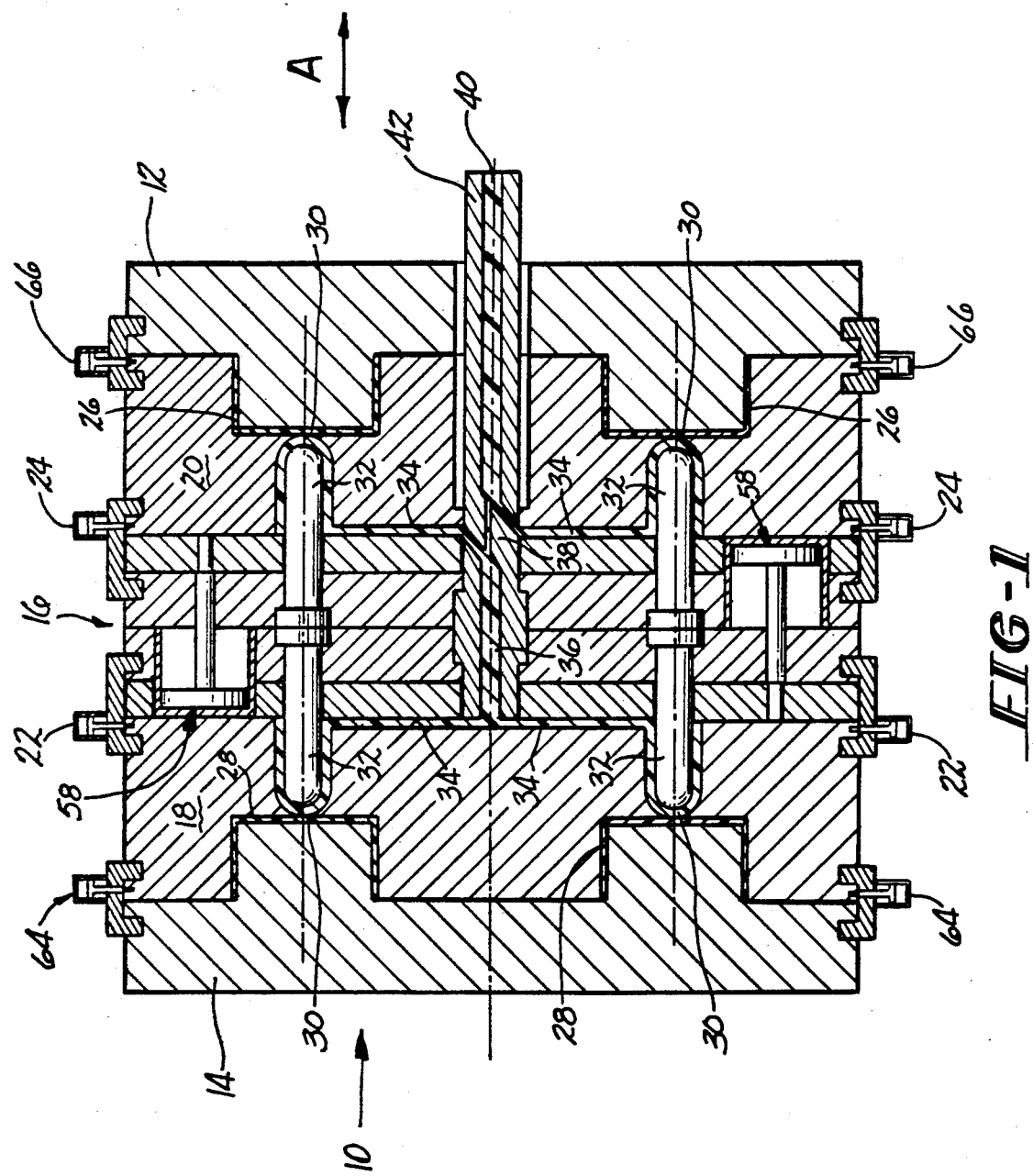
FIG. 1 illustrates a stack mold in a closed position having an insulated runner.

FIGS. 1-5 illustrate a first embodiment of a stack mold apparatus having an insulated runner system. The stack mold is shown in FIG. 1 in its closed position. The stack mold (10) includes a first mold portion (12), a second mold portion (14), and a central mold portion (16) intermediate the first and second mold portions. The first mold portion may comprise a stationary mold half having a core plate attached thereto. The mold portions (14, 16) may be movable relative to the mold portion (12) along an axis (A) between a mold open and a mold closed position. The manner in which the mold portions move relative to each other is well known in the art and will not be described in detail here. Any suitable hydraulic ram system and tie bar arrangement known in the art may be provided for moving the mold portions (14, 16) relative to the mold portion (12).

The mold portion (14) also includes a core plate. The central mold portion (16) has attached thereto a pair of cavity plates (18, 20). The cavity plates are fixed to the central mold portion by latches (22, 24). The latches (22, 24) may comprise any suitable latching means known in the art. For example they could be the locking means shown in Siegel U.S. Pat. No. 3,183,555, which is incorporated by reference herein.

When the mold (10) is in its mold closed position, the core plates and the cavity plates form a plurality of mold spaces (26, 28). Resin or other plastic materials are then injected into the spaces (26, 28) so as to form the molded articles or parts.

The resin or plastic material is supplied to each mold space (26, 28) through a respective gate (30) via a heated nozzle (32) which in turn is connected via runners (34) to a central channel (36). The gates (30) are machined into each of the cavity plates in a manner well known in the art. The central channel (36) is in turn connected via a restricted portion (38) to a supply channel (40) in a sprue bar (42). Resin or plastic material is supplied from a machine nozzle (not shown) via an orifice into the supply channel. When the mold is in its closed position, the resin or plastic machine is injected so as to fill the channel (36), the runners (34) and the spaces (26, 28).

Figure 2:
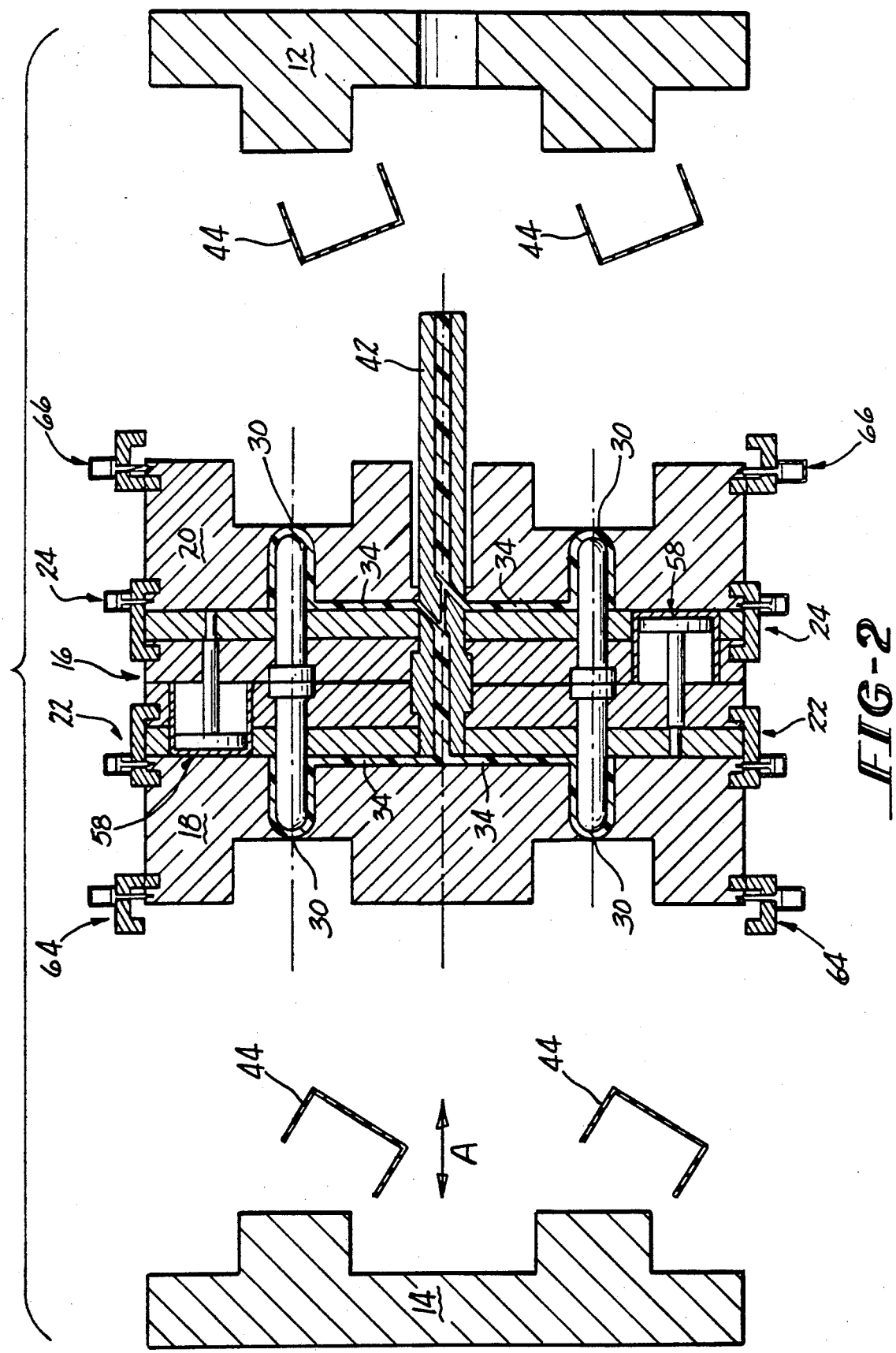
FIG. 2 illustrates the stack mold of FIG. 1 in the open position during ejection of the molded parts.

As shown in FIG. 2, the molded parts (44) are ejected off the core plates (12, 14) by known means such as ejector pins (not shown) or the like. After the parts are ejected, the mold is again closed and the cycle repeated. During the normal mold open cycle, only the parts (44) are ejected. The runners are not ejected during this portion of the cycle. This is because the resin in the channel (36), the runners (34) and the nozzles remains molten by virtue of the heat trapped in the resin insulated from the cooler surfaces of the plates (18, 20) and the sprue bar (42). The insulation is formed by resin or plastic material next to these surfaces which has cooled and solidified. This plastic material insulates the inner molten resin flowing through the various components of the injection system.

In normal operation the mold is cycled frequently, typically 6-10 times a minute. This prevents complete solidification of the runner due to loss of inner heat by conduction through the insulating layer.

Figure 3:
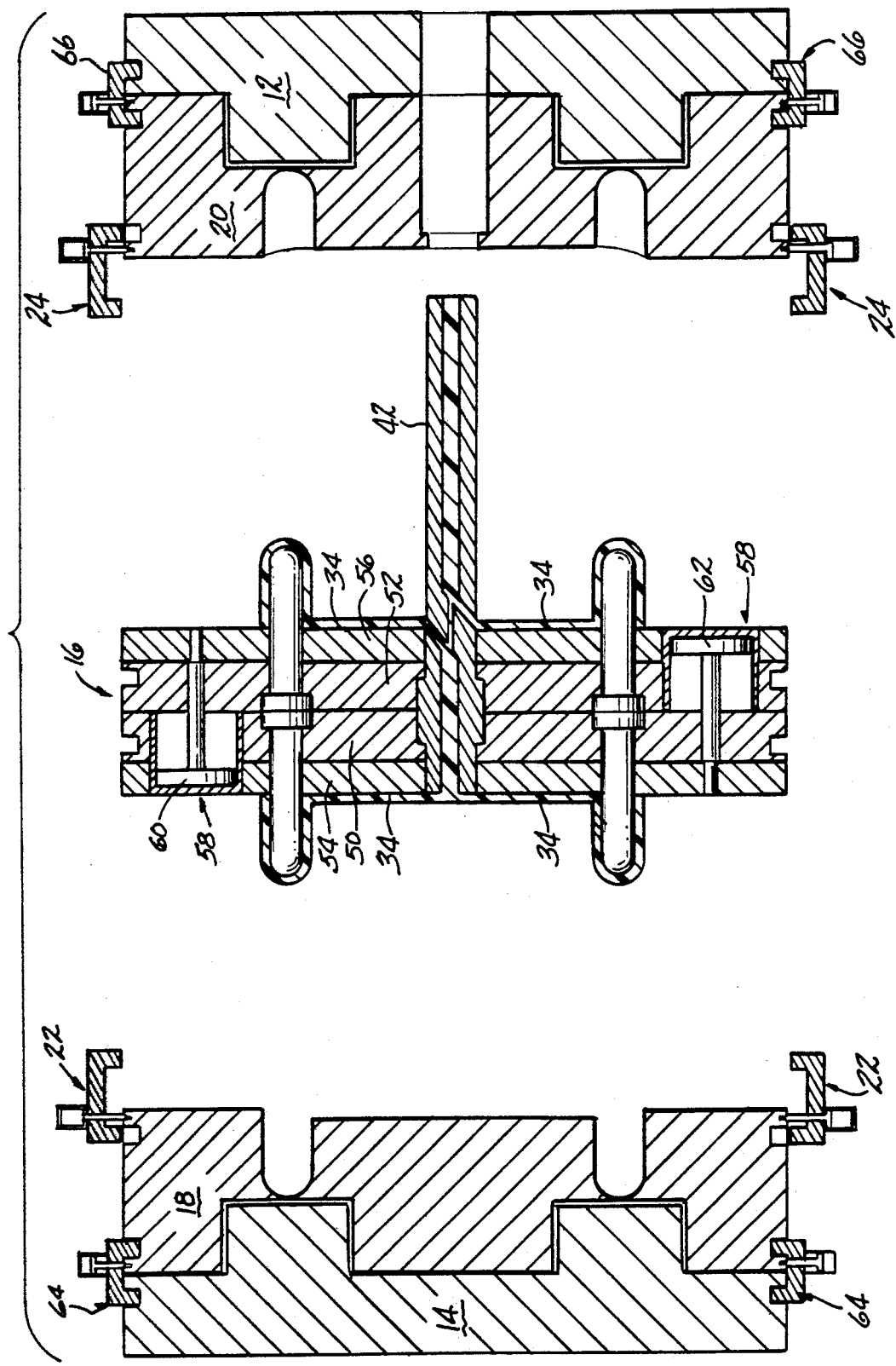
FIG. 3 illustrates the stack mold of FIG. 1 with the cavity plates latched to the core plates in preparation for the ejection of runners.
Figure 4:
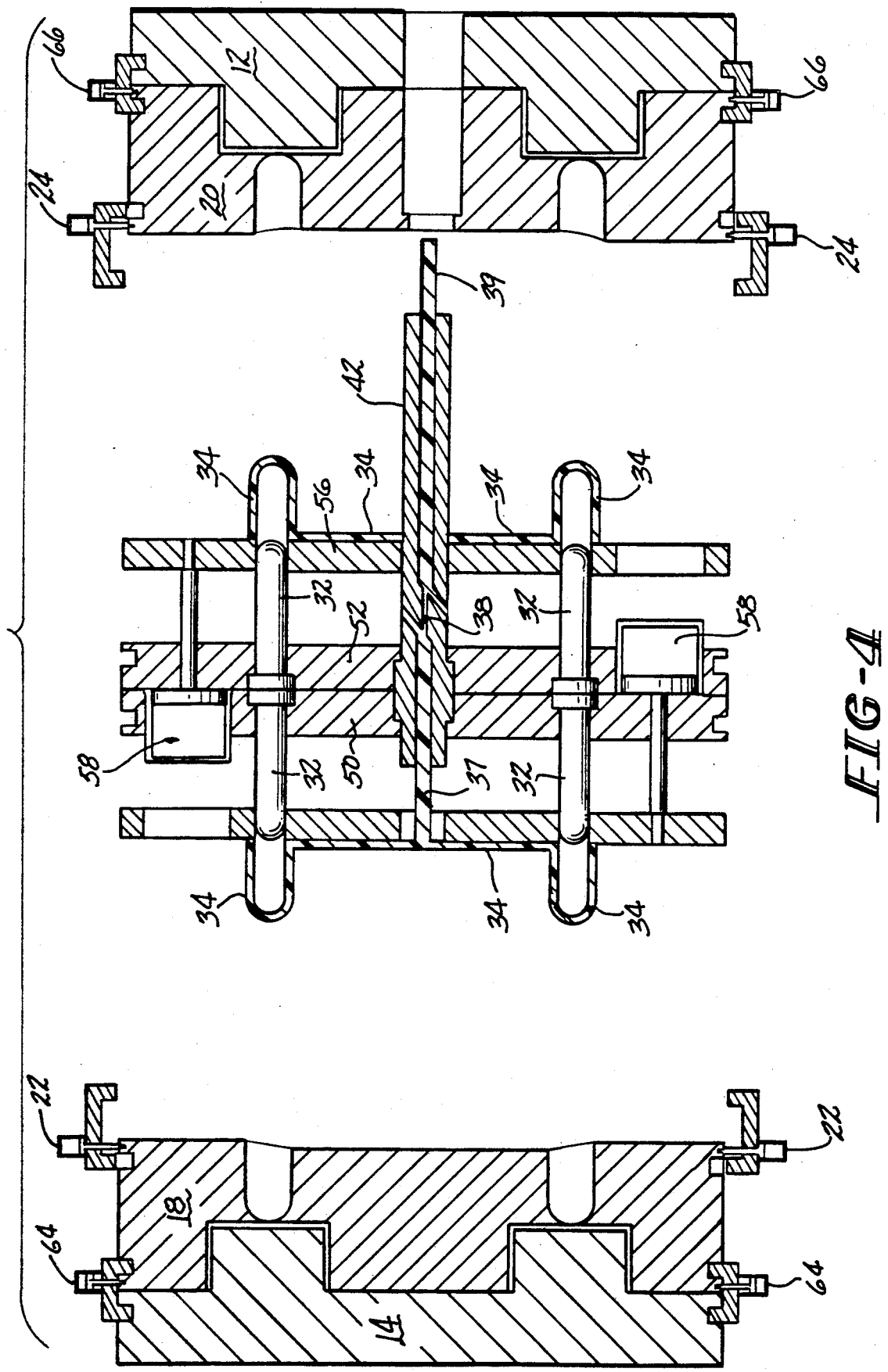
FIG. 4 illustrates the stack mold of FIG. 3 ejecting the runners.
Figure 5:
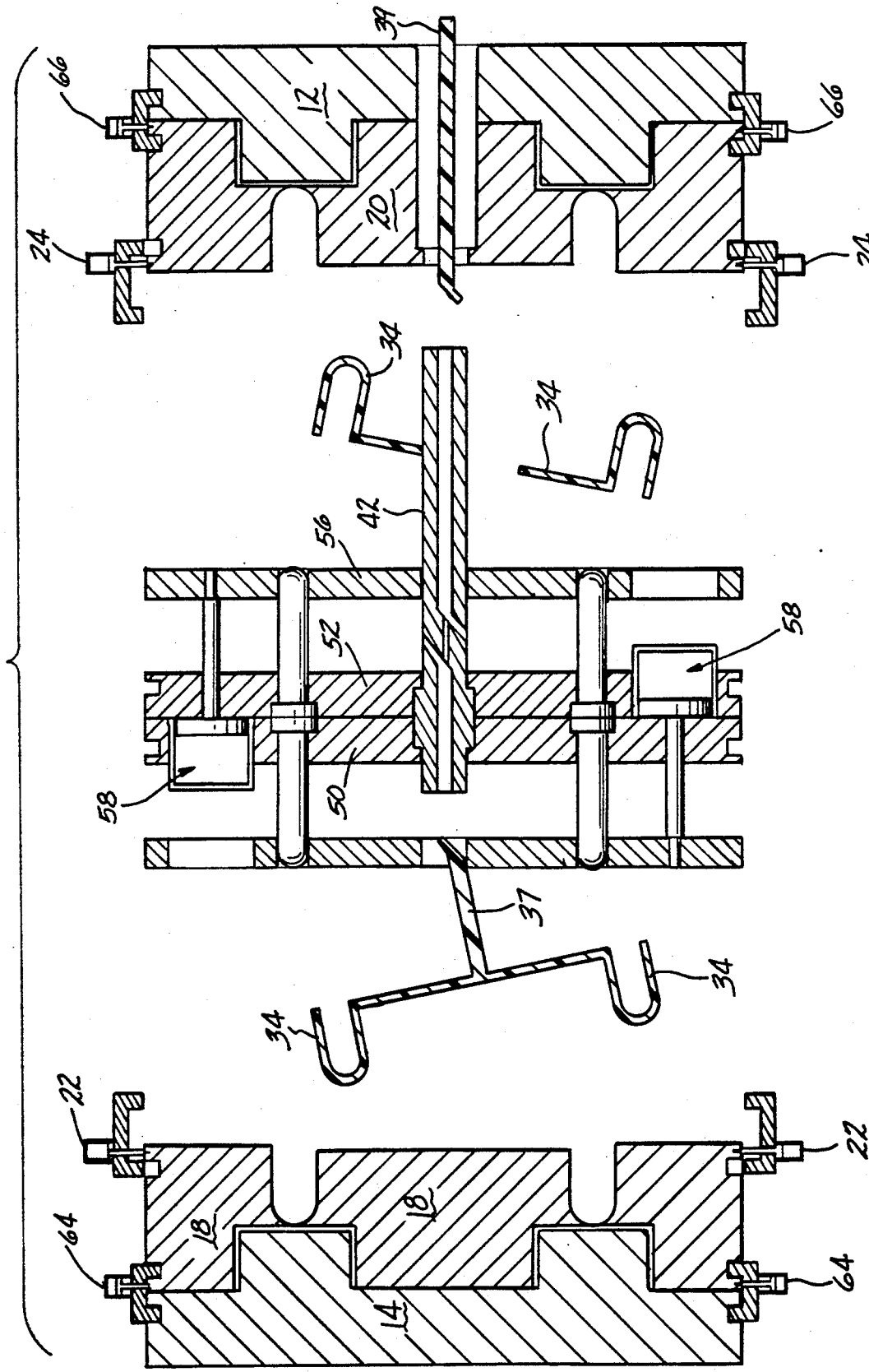
FIG. 5 illustrates the stack mold of FIG. 4 with the runners falling clear.

When it is necessary to change materials or colors, the runner system is allowed to solidify. After the solidification has been completed, the runner system is ejected, automatically, from the mold. FIGS. 3-5 illustrate the manner in which the runner system is ejected from the mold (10).

As shown in FIG. 3, the central mold portion (16) comprises two central plates (50, 52) and two ejector plates (54, 56) mounted thereto for relative movement by actuation mechanisms (58).

Each actuation mechanism (58) may comprise any suitable means known in the art, i.e. a piston-cylinder arrangement. As shown in FIG. 3, the piston-cylinder arrangement may comprise a first fluid actuated piston (60) connected to the ejector plate (56) and a second fluid actuated piston (62) connected to the ejector plate (54). Operation of the ejector plates (54, 56) and the piston cylinder arrangements (60, 62) will be discussed hereinafter.

It should be noted from FIG. 3 that to gain access to the runner system for ejection, it is necessary to move the cavity plates (18, 20) relative to the remainder of the central mold portion (16). This is accomplished by releasing the latch means (22, 24) connecting the plates (18, 20) to the central mold portion (16) and engaging a second set of latch means (64, 66) to lock the cavity plates (18, 20) to the core plates (14, 12) respectively. The latches (64, 66) may comprise any suitable latching arrangement known in the art. Preferably, the latches (64, 66) are identical in construction to the latches (22, 24).

After the latches (64, 66) are moved to their engagement position to clamp the core and cavity plates together, the mold may be opened in its normal fashion such as by a machine movable platen and a conventional stack mold centering mechanism not shown. As the mold moves toward the mold open position, the cavity plates (18, 20) will travel with the core plates (12, 14) and thereby expose both sides of the runner system.

After the mold has reached its mold opened position, the fluid actuated pistons (60, 62) are energized to move the ejector or runner plates (54, 56) away from the center plates (50, 52). As a result, the solidified runners (34), any nozzle resin (39) and any channel resin (37) are disengaged from their surface contacts. As shown in FIG. 5, the runners, the nozzle resin and the channel resin will fall clear of the mold.

Figure 10:
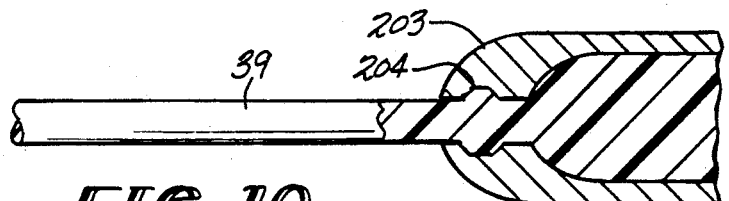
FIGS. 10 and 11 show a nozzle having an undercut feature for removing solidified material from the sprue bar.
Figure 11:
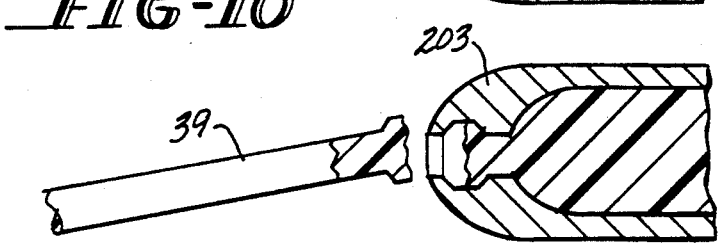
Figure 12:
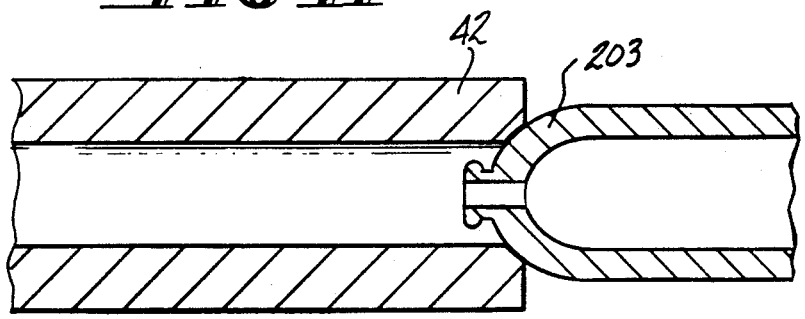
FIGS. 12-14 show an alternative nozzle embodiment.
Figure 13:
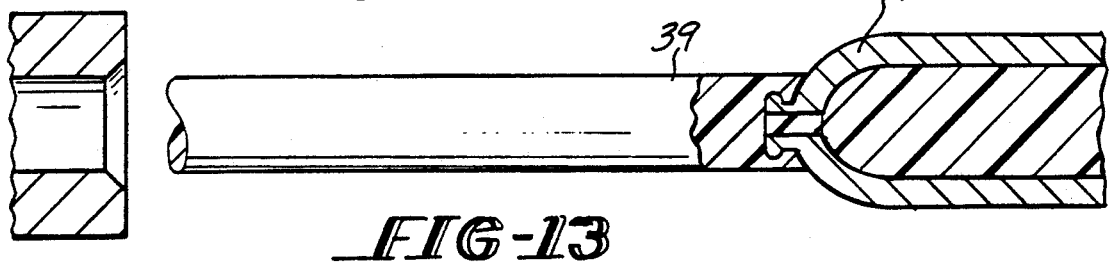
Figure 14:
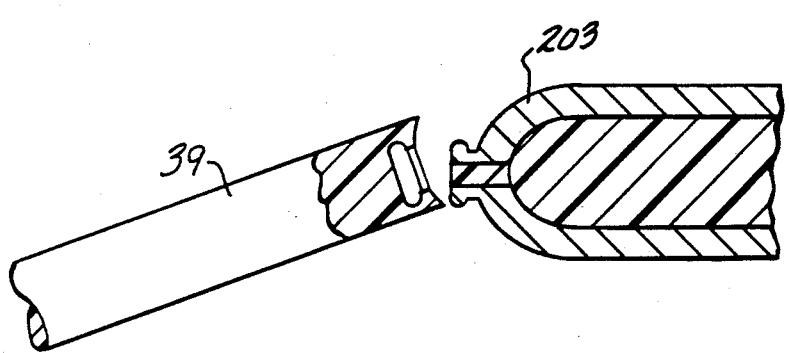

The solidified material in the sprue channel (40) is removed in a well known manner in the art. As shown in FIGS. 10 and 11, the solidified material is held in the machine (203) by virtue of an undercut (204). As the mold opens to eject the runners, the solidified sprue bar runner first separates into two pieces (37) and (39) at the thin section (38). Portion (37) attached to the main runner (34) is moved to the left and portion (39) held in the machine nozzle is moved to the right, causing the break at (38) and the two pieces being drawn out of opposite ends of the sprue. Once retracted, the machine nozzle and cooled runner portion (39) is accessible from outside the machine by the operator who simply grabs the frozen runner with a gloved hand and pulls it out of the machine nozzle. FIGS. 12-15 show a preferred embodiment of the machine nozzle configuration for withdrawing the frozen sprue bar slug (39) from the sprue bar (42). In this embodiment, the slug freezes onto the outside of the nozzle and not inside. This facilitates removal by the operator.

After ejection of the runner is completed, the mold and, in particular, the plates (18, 20) are returned to the mold closed position. The latches (64, 66) are then disengaged and the latches (22, 24) are engaged. The mold (10) is then ready for molding as shown in FIG. 1.

Figure 6:
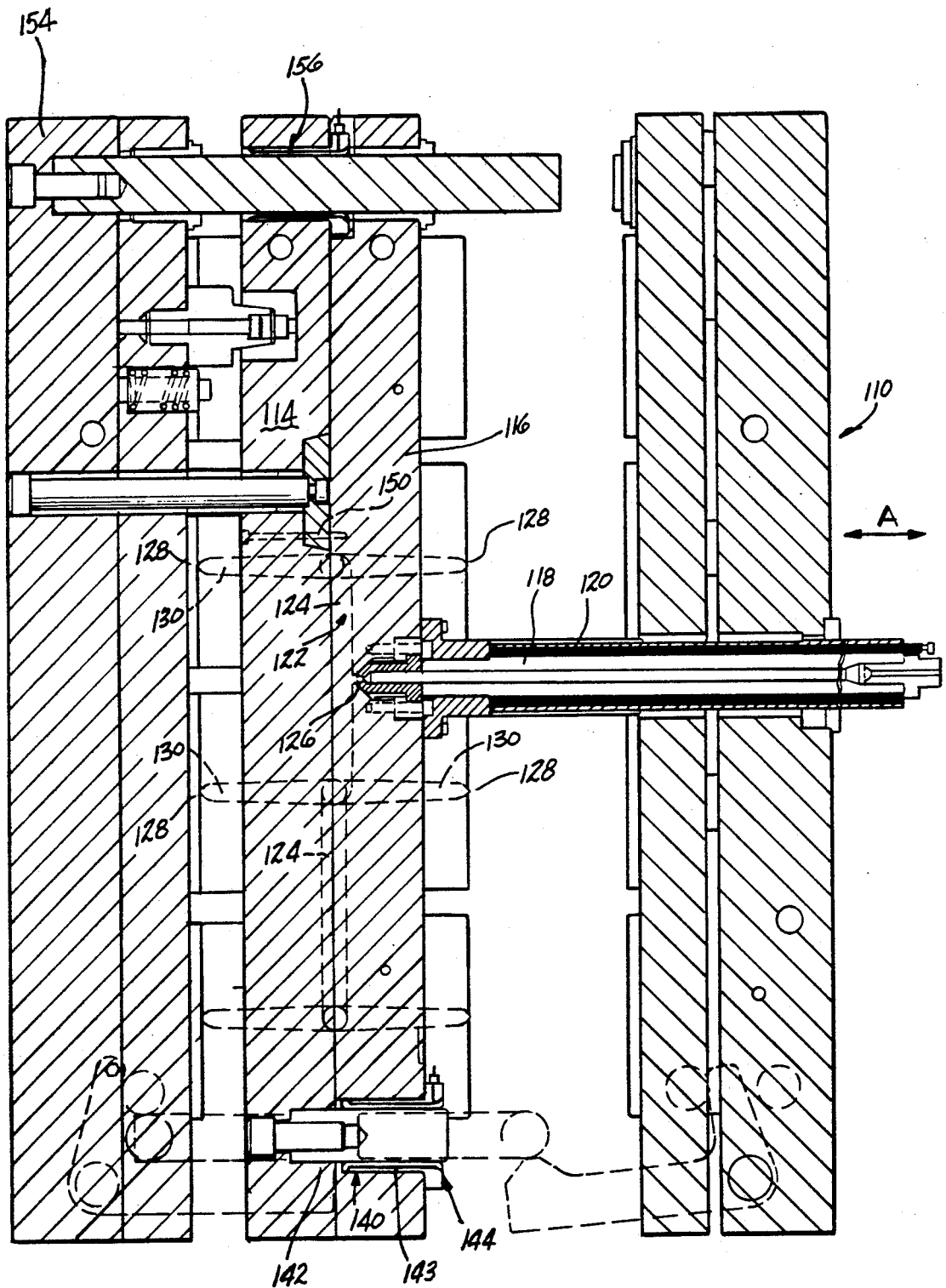
FIG. 6 shows an alternate embodiment of a stack mold having an insulated runner system with one side being shown opened and the other side being shown closed.
Figure 7:
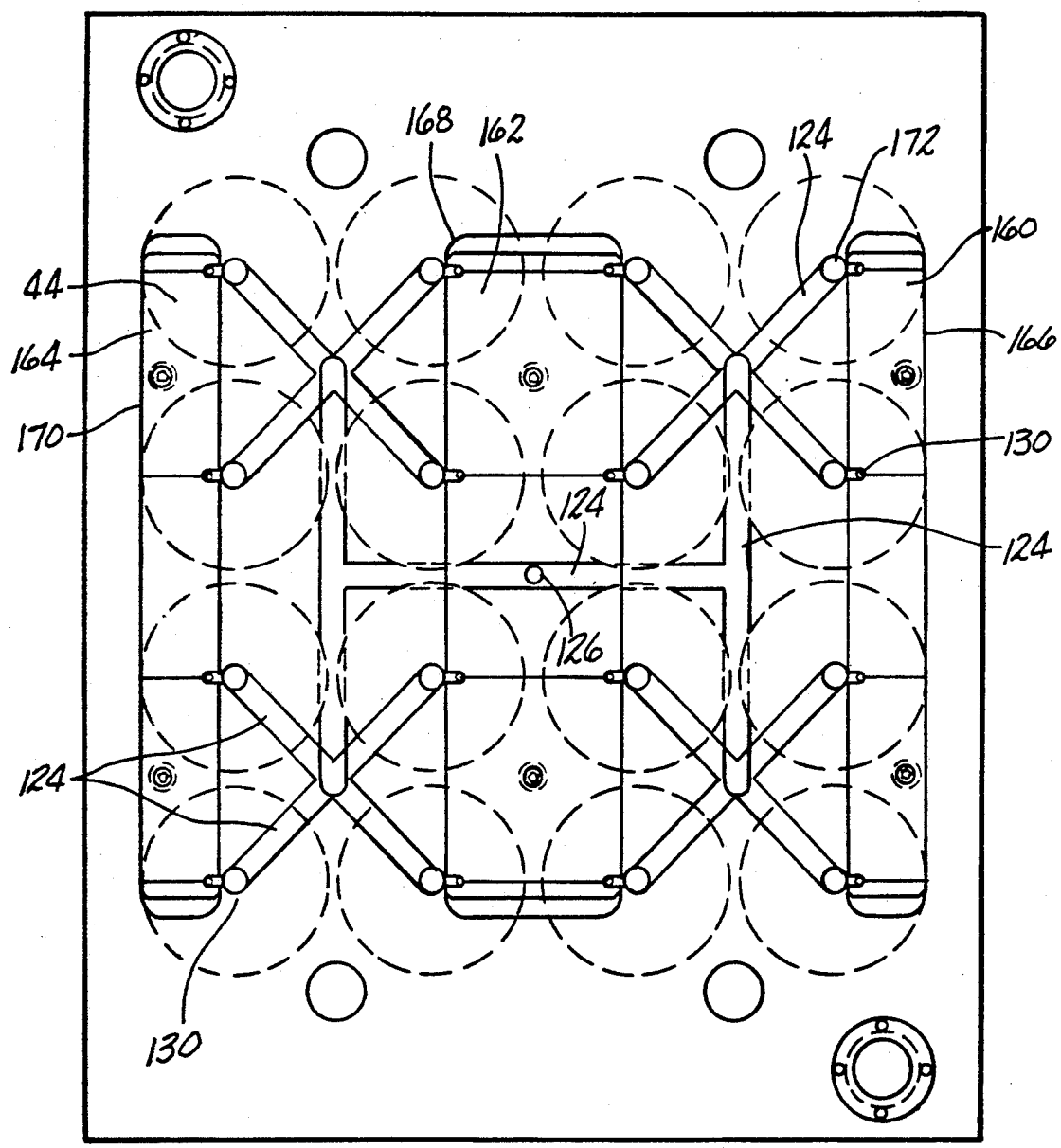
FIG. 7 illustrates a cavity plane view of the stack mold of FIG. 6.
Figure 8:
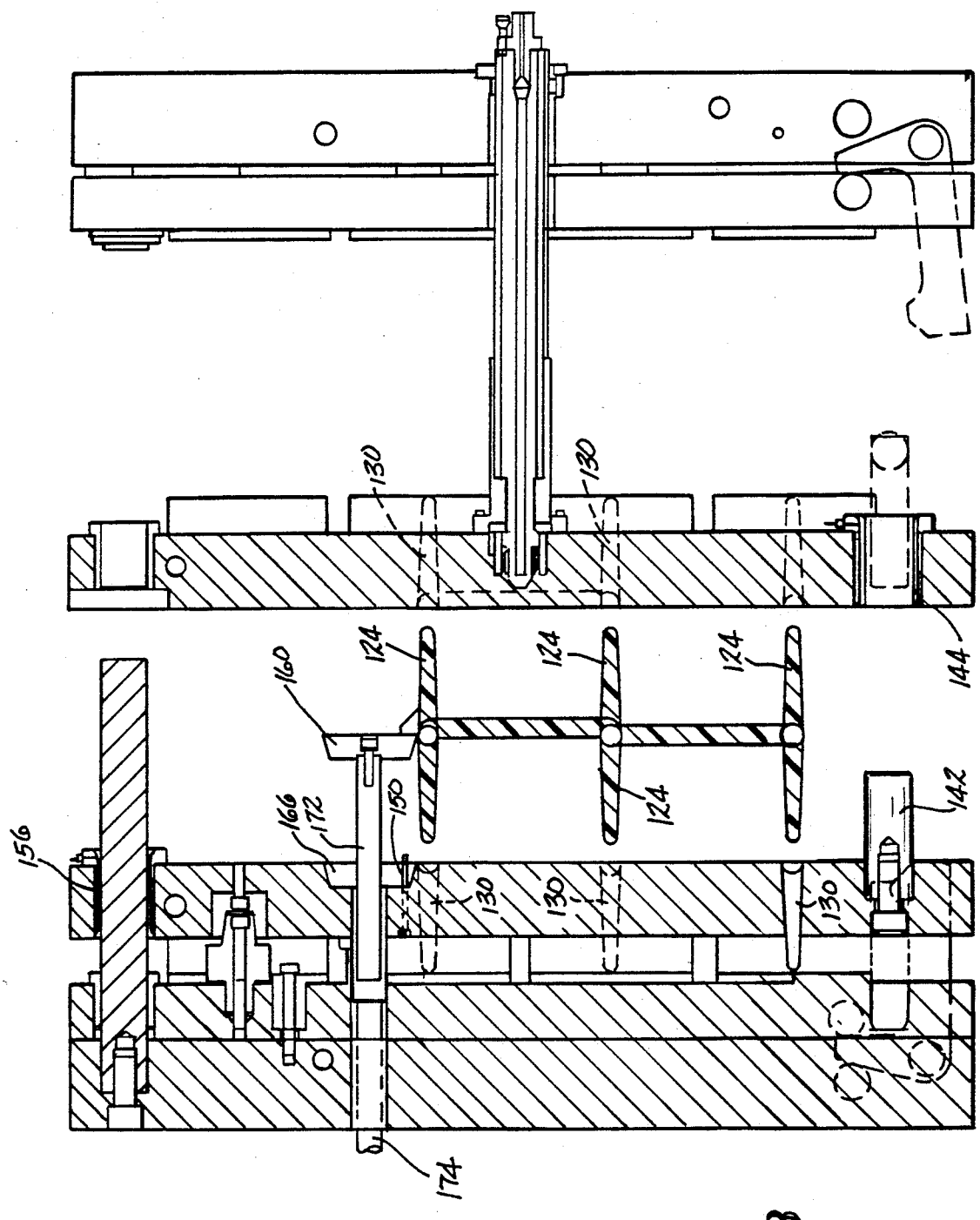
FIG. 8 illustrates the stack mold of FIG. 6 with the runner being ejected.

FIGS. 6-8 illustrate a preferred embodiment of the present invention. This embodiment has several differences from the apparatus shown in FIGS. 1-5. In particular, the molding apparatus (110) has a central mold portion defined by two plates (114, 116). As will be described in more detail hereinafter, these two plates are movable relative to each other.

The molding apparatus (110) further includes a sprue bar (118) which is fastened to the plate (116). The sprue bar (118) is heated by heaters (120) so that the resin or the plastic material flowing therethrough does not solidify.

The runner system (122) is defined by a number of passageways (124) cut into the plates (114, 116). A nozzle (126) forms a hot/cold interface between the sprue bar (118) and the runner system (124) such that at the time of runner ejection a separation occurs at the nozzle.

The resin or plastic material flows from the runner system (124) to the gates (128) via channels (130). As before, molten plastic material or resin flowing through the gates fills the mold space between a mold cavity plate and a mold core plate to form the molded articles or parts.

A typical runner layout which can be used with the molding apparatus (110) is shown in plan view in FIG. 7. The runners (124) extend from the central nozzle (126) to each of the gated channels (130). The mold shown in FIG. 7 has 16 cavities on each molding face and is designated as a 2×16 or 32 cavity stack mold.

The two center plates (114, 116) are typically held together by a clamping pin and sleeve combination or gripper sleeves (140). The pin and sleeve combination may comprise a pin (142) which can be inserted inside a sleeve (144). When the pin (142) is positioned inside the sleeve (144), it is gripped by a pressurizing hydraulic fluid in the walls (143) of the sleeve (144) which causes the walls to deflect and grip the pin. A suitable pin and sleeve combination which may be utilized to lock the plates (114, 116) together is shown and described in Siegel U.S. Pat. No. 3,835,555, which is incorporated by reference herein. Alternatively, the pin and sleeve combination could be one of the embodiments illustrated in copending patent application Ser. Nos. 577,308, filed Sept. 4, 1990, and 637,814, filed Jan. 7, 1991. It has been found that the use of such a pin and sleeve combination greatly facilitates the automation of the runner injection system.

FIG. 8 illustrates the mold (110) in a mold open position. It also illustrates the manner in which the runner system is ejected. The runners (124) are allowed to solidify when the plastic material or color is to be changed. As they solidify, they form about a series of sucker pins (150). One sucker pin is preferably provided for each gate channel (130). The sucker pins ensure that when the center plates (114, 116) are separated the runner system stays with the center plate (114) on the moving side of the molding apparatus.

To separate the center plate (114) from the plate (116), the gripper system (140) is disengaged so that the plates are free to move relative to each other. Movement of the plate (114) is accomplished by joining the plate (114) to the moving mold portion (154). This is done by a second set of gripper sleeves (156). The gripper sleeves (156) may be identical in construction to the gripper sleeves (140). When engaged, the gripper sleeves (156) clamp a moving core half of the mold to the plate (114) so that as the machine is moved to an open position the plate (114) separates from the plate (116). As can be seen from this description, half of the runner system is withdrawn from the channels (130) in the plate (116).

After the mold (110) has reached its full open position as shown in FIG. 8, the apparatus' ejector system is activated to push a runner stripper system forward. The runner stripper system is formed by a series of bars (160, 162, and 164), shown in FIG. 7, housed within channels (166, 168 and 170) respectively. Each bar is moved between a retracted position within the housing to an extended ejection position by a push rod (172) connected to each bar and an injector pin (174) communicating with the push rod. As the machine's ejector (174) push the rods (172), the bars (160, 162 and 164) are extended. This causes the runners (134) to be stripped from the sucker pins which retained them on the plate (116).

Once the solidified material in the channels (130) of the runner system have cleared the center plate (114), the runners falls from the bars (160, 162 and 164) and out of the mold area. The mold (110) may then be closed up. When the mold has reached its fully closed position, the gripper sleeves (156) are disengaged and the gripper sleeves (140) are reengaged. This returns the molds to their operational status for permitting the mold spaces to be filled with a fresh resin and form new molded parts.

Because the resin in the sprue bar (118) has not been ejected, it must be purged through the mold during several shots of injected resin. As a result, the automatic runner ejection sequence may be used several times before all the old resin in the sprue bar has been purged. After all the old resin has been purged, the mold is ready for processing the new resin. Despite having to purge two or three shots through the mold to clean the sprue bar, it has been found that a considerable time saving through resin changing is still achieved.

By having the runner systems cut in the face of the plates (114, 116), the ability to machine smoothly curved runner passages is greatly facilitated. As a result, sharp corners and other undesirable runner features founded in hot runner channels which cause the resin to hang up and degrade are eliminated. This means heat sensitive resins like PVC, nylon, and the like, normally difficult to process in hot runners, can be easily used in this type of runner system.

Figure 9:
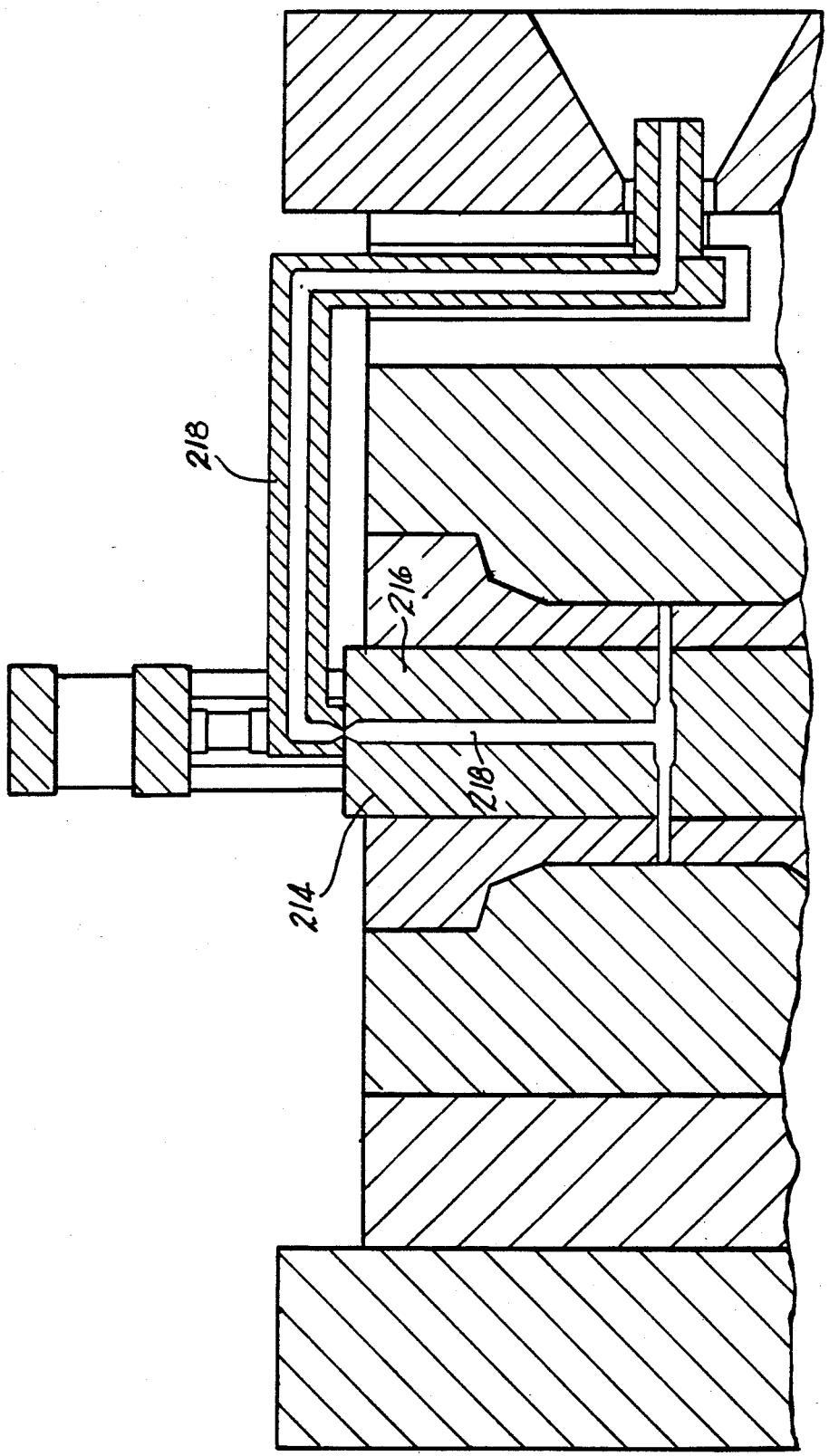
FIG. 9 shows yet another embodiment of a stack mold apparatus with an offset sprue bar supplying resin to an insulated runner in the stack mold.

FIG. 9 illustrates yet another embodiment of a stack mold apparatus in accordance with the present invention. In this apparatus, the sprue bar (218) is offset so as to permit the stack molding of large parts, one per face of the stack mold. Here again, the center plates (214, 216) can be separated to eject the runner (218).

It is apparent that there has been provided in accordance with this invention a stack mold with an insulated runner which fully satisfies the objects, means, and advantages set forth hereinafter. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding apparatus for forming plastic articles, said apparatus comprising:
    a first mold portion, a second mold portion and a third mold portion intermediate said first and second mold portions;
    said first, second and third mold portions being relatively movable along a first axis between mold open and mold closed positions;
    said first mold portion having a first mold plate;
    said second mold portion having a second mold plate;
    said third mold portion having third and fourth mold plates;
    said first and third mold plates defining at least one mold space and said second and fourth mold plates defining at least one other mold space;
    means for supplying molten plastic material to said mold spaces;
    said plastic material supplying means including an insulated mold runner system which allows molten plastic material within said runner system to remain molten between molding cycles; and
    means for ejecting said runner system in a direction substantially parallel to said first axis.

2. The apparatus of claim 1 wherein:
    said third mold portion comprises first and second central plates movable relative to each other and said runner system comprises passageways cut into said plates.

3. The apparatus of claim 2 wherein:
    said plastic material supplying means includes a sprue bar fastened to said second central plate; and
    said sprue bar is heated to substantially prevent solidification of said plastic material in said sprue bar.

4. The apparatus of claim 3 further comprising:
    said sprue bar being offset with respect to said third mold portion so as to facilitate the molding of large parts.

5. An injection molding apparatus for forming plastic articles, said apparatus comprising:
   a first mold portion, a second mold portion and a third mold portion intermediate said first and second mold portions;
   said first, second and third mold portions being relatively movable along a first axis between mold open and mold closed positions;
   said first mold portion having a first mold plate;
   said second mold portion having a second mold plate;
   said third mold portion having third and fourth mold plates;
   said first and third mold plates defining at least one mold space and said second and fourth mold plates defining at least one other mold space;
   means for supplying molten plastic material to said mold spaces;
   said plastic material supplying means including a runner system;
   means for ejecting said runner system in a direction substantially parallel to said first axis;
   said third mold portion further having at least one central plate and two spaced apart ejector plates movable relative to said at least one central plate; and
   said ejecting means comprising piston-cylinder means for moving said ejector plates relative to said at least one central plate so as to eject said runner system.

6. The apparatus of claim 5 further comprising:
   means for latching said third and fourth plates to said at least one central plate during molding of said plastic articles; and
   means for latching said first and third plates together and said second and fourth plates together during ejection of said runner system.

7. The apparatus of claim 5 wherein said molten plastic material supply means comprises:
   a central channel in said third mold portion;
   a gate and a heated nozzle associated with each mold space for supplying molten plastic material thereto; and
   said runner system comprising a runner connecting each said gate and heated nozzle to said central channel.

8. The apparatus of claim 7 wherein said supply means further comprises:
   a sprue bar having a supply channel; and
   a restricted flow passage connecting said supply channel to said central channel.

9. The apparatus of claim 7 wherein each said runner has a layer of solidified plastic material therein, said solidified plastic material forming an insulating layer for molten plastic flowing through said runner.

10. An injection molding apparatus for forming plastic articles, said apparatus comprising:
    a first mold portion, a second mold portion and a third mold portion intermediate said first and second mold portion;
    said first, second and third mold portions being relatively movable along a first axis between mold open and mold closed positions;
    said first mold portion having a first mold plate;
    said second mold portion having a second mold plate;
    said third mold portion having third and fourth mold plates;
    said first and third plates defining at least one mold space and said second and fourth mold plates defining at least one other mold space;
    means for supplying molten plastic material to said mold spaces;
    said plastic material supplying means including a runner system;
    means for ejecting said runner system in a direction substantially parallel to said first axis;
    said third mold portion including first and second central plates movable relative to each other;
    said runner system comprising passageways cut into said plates;
    means for latching said two central plates together during molding of said plastic articles; and
    means for latching said first central plate to one of said first and second plates so as to move said first central plate relative to said second central plate.

11. The apparatus of claim 10 wherein said ejecting means comprises:
    said first central plate having at least one sucker pin for withdrawing solidified runners from passageways in said second central plate.

12. The apparatus of claim 11 wherein said ejecting means further comprises:
    at least one movable bar housed in a channel in said first central plate; and
    means for moving said at least one bar relative to said first central plate so as to strip said solidified runners from said at least one sucker pin and eject said runners.

13. The apparatus of claim 12 wherein said ejecting means comprises a plurality of spaced bars, each housed in a channel in said first central plate.

14. The apparatus of claim 12 wherein said moving means comprises:
    a rod mounted to each said bar; and
    an ejector pin for moving said rod and thus said bar between a retracted position and an extended position.

15. The apparatus of claim 10 wherein each of said latching means comprises a clamping pin and sleeve arrangement.

* * * * *